Jan. 26, 1926.
J. M. ZIMLICH
1,571,082
AGRICULTURAL MACHINE
Filed June 6, 1923
4 Sheets-Sheet 2
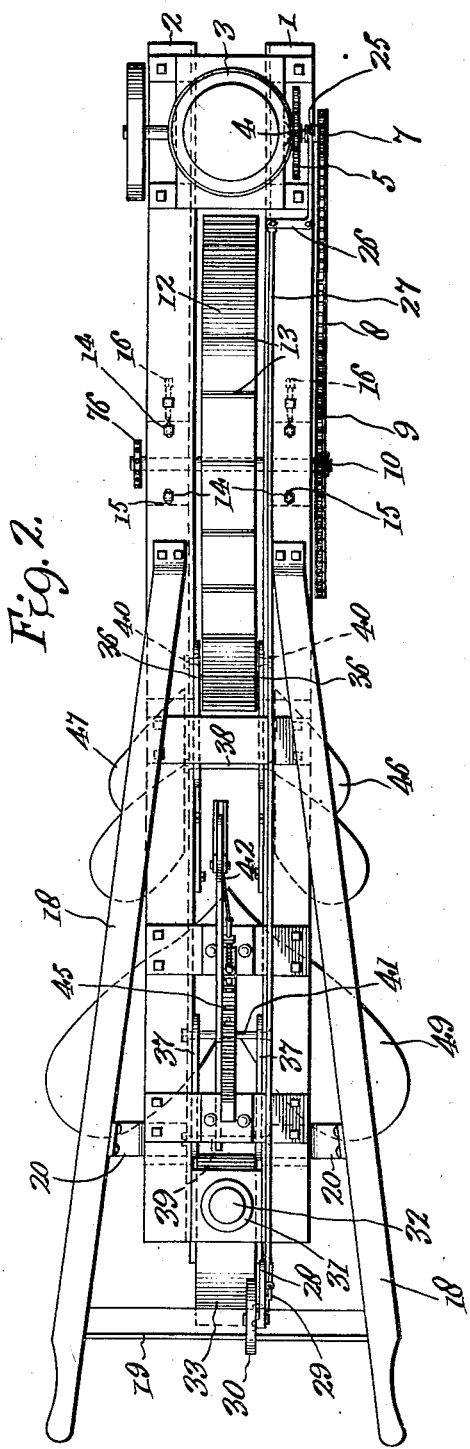
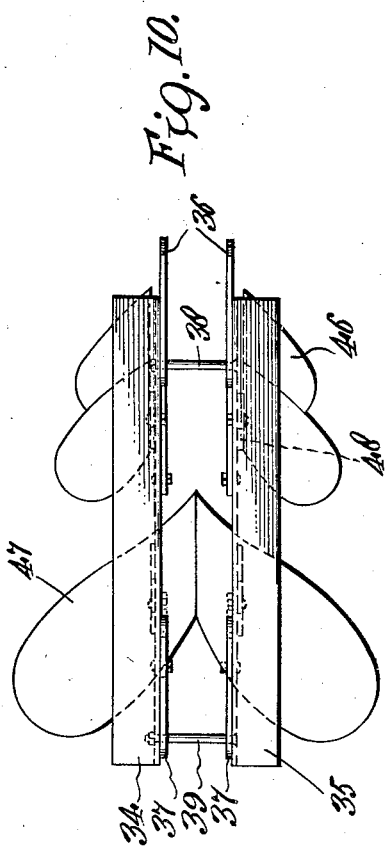
Inventor
J.M. Zimlich
by Wilkinson & Giusta
Attorneys.

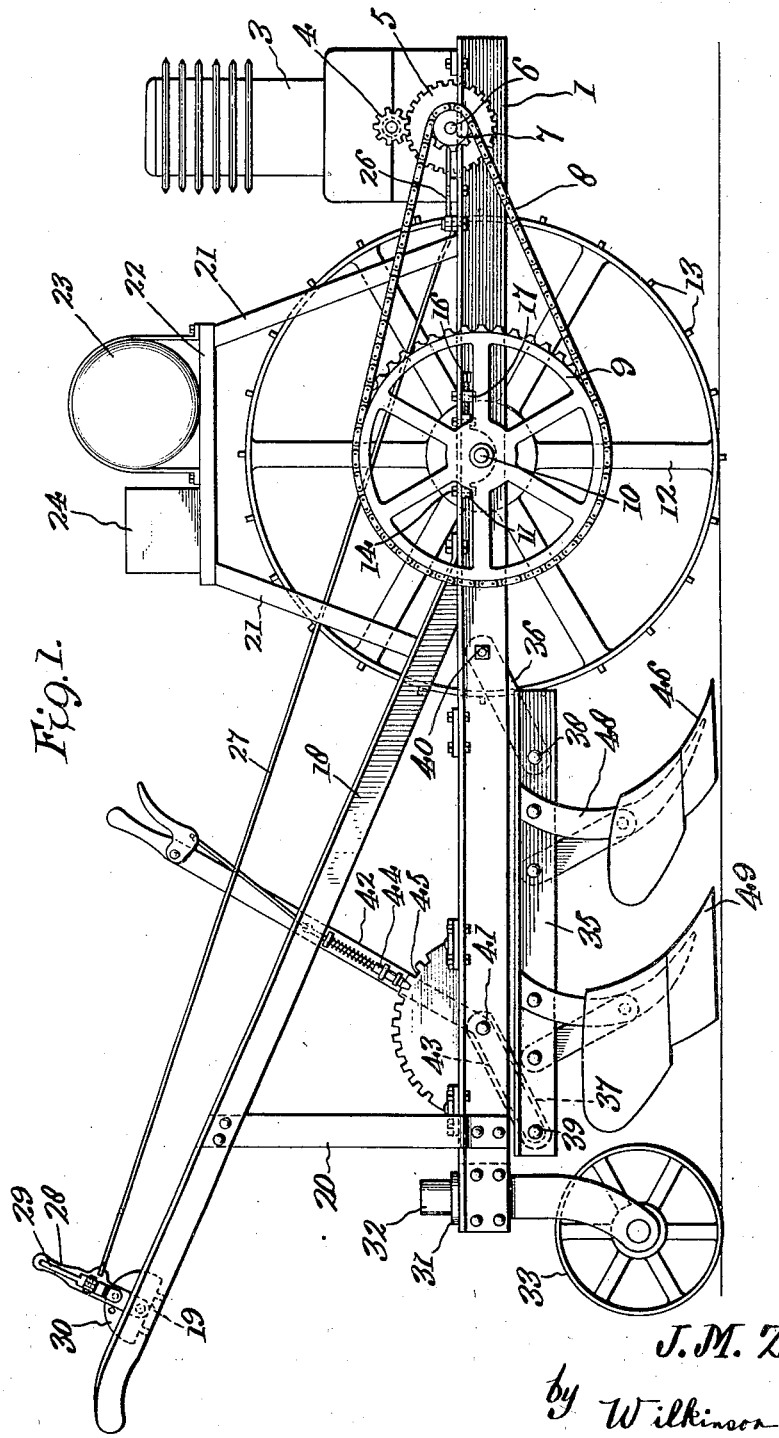

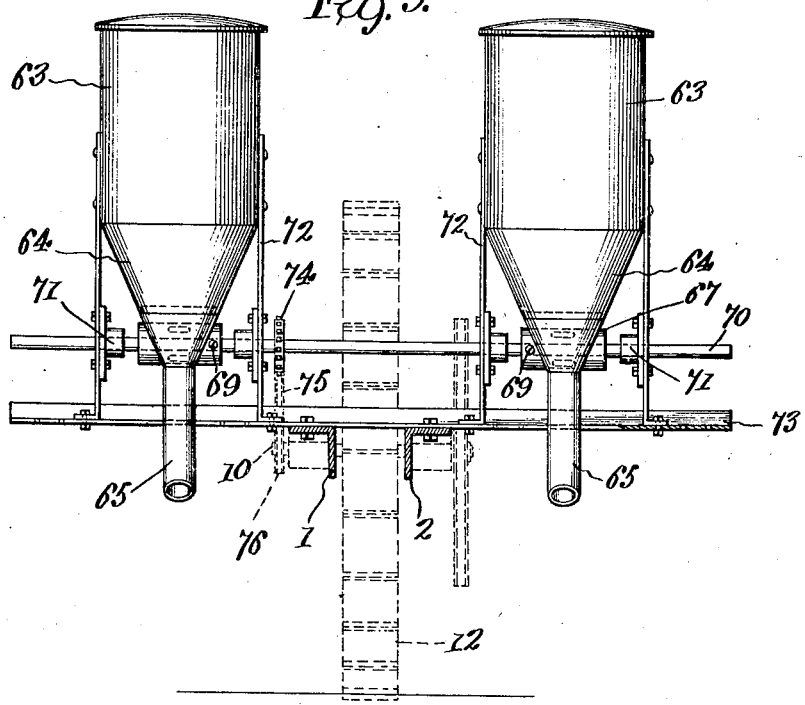
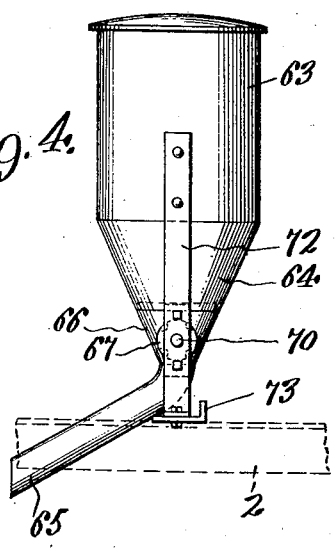
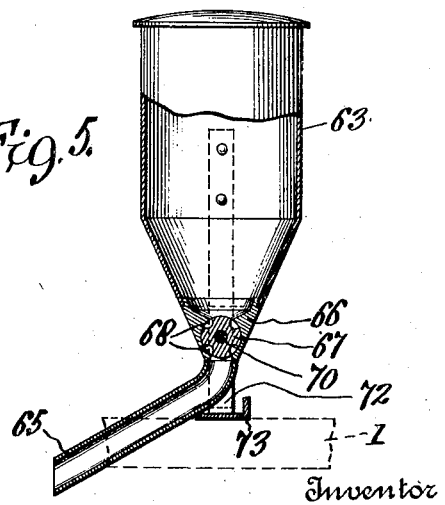

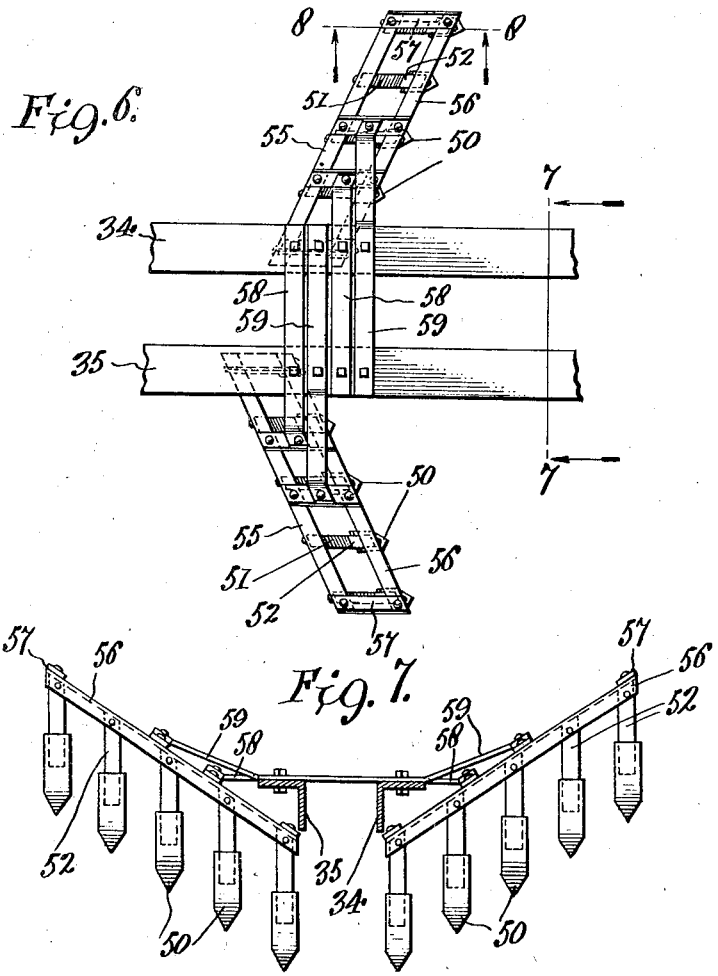
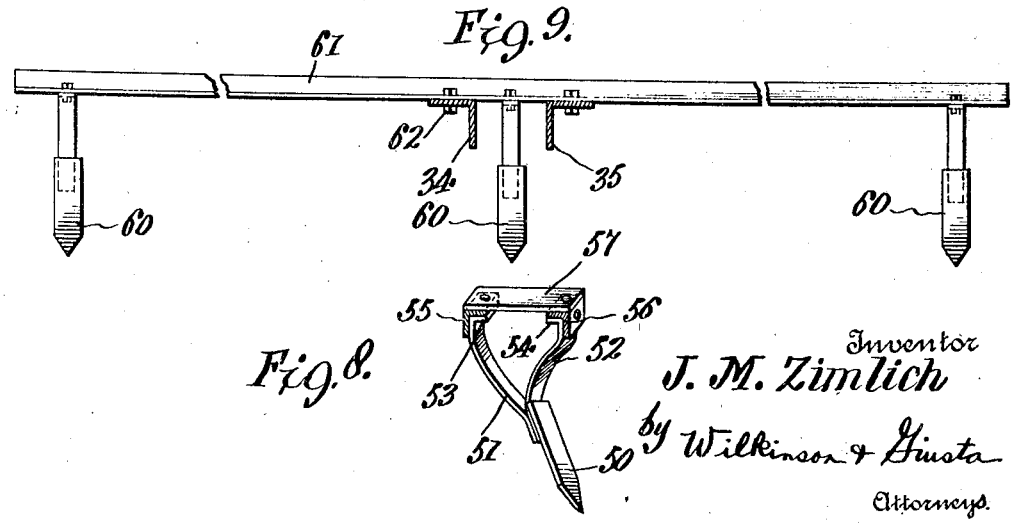

Patented Jan. 26, 1926.

1,571,082

UNITED STATES PATENT OFFICE.

JULIUS M. ZIMLICH, OF MOBILE, ALABAMA.

AGRICULTURAL MACHINE.

Application filed June 6, 1923. Serial No. 643,732.

*To all whom it may concern:*

Be it known that I, JULIUS M. ZIMLICH, a citizen of the United States, residing at Mobile, in the county of Mobile and State of Alabama, have invented certain new and useful Improvements in Agricultural Machines; and I do hereby declare the following to be a full, clear, and exact description of the invention, such as will enable others skilled in the art to which it appertains to make and use the same.

The present invention relates to improvements in agricultural machines and more particularly to tractors or hand tractors by which a variety of agricultural operations may be performed such as cultivating between growing crops, for making ridges and cultivating crops planted on ridges such as the truck crops in regions of great rainfall.

Other objects of the invention are to simplify the tractor, reduce the expense of its manufacture and the expense attendant upon its use in the fields, to render more compact and effective the agricultural implements and the frame to which they are attached, and in general to provide a more satisfactory and efficient machine for general agricultural purposes.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a side elevation of an apparatus constructed according to the present invention and illustrated as set up for making the ridges at one passage.

Figure 2 is a top plan view of the same with the fuel tank and superstructure removed for clearness.

Figure 3 is an end elevation of a fertilizer attachment to be used in conjunction with the device and showing certain parts in dotted lines.

Figure 4 is a side view showing one of the distributing hoppers.

Figure 5 is a vertical section through one of the distributing hoppers.

Figure 6 is a plan view of the side harrows used for cultivating the sides of the ridges and showing the angle at which the harrows are held.

Figure 7 is a front view of the same with parts shown in section showing the arrangement and disposition of the harrow blades or teeth.

Figure 8 is a perspective view with parts shown in section of one of the cultivator points or teeth, and Figure 9 is a front view with parts in section showing a marking attachment for laying off a field preparatory to making the ridges, and Figure 10 is a plan view of the secondary frame and plows detached from the remainder of the apparatus.

Referring more particularly to the drawings, 1 and 2 designate two beams, preferably of angle iron, which are braced together and held in substantially parallel though spaced relation to constitute the main frame of the tractor. These two beams 1 and 2 support at their front ends an internal combustion or other engine 3. This engine is only conventionally shown as it forms no part of the present invention. Suffice it to say that the engine drives the pinion 4 which is disposed in mesh with the gear wheel 5 made fast to a shaft 6 which is journaled in appropriate bearings in the main frame and carries a sprocket 7 engaged by a chain 8. This chain drives a larger sprocket 9 fixed on the axle 10 journaled in the bearing blocks 11 secured beneath the horizontal flanges of the angle beams. The axle also passes fixedly through the single ground wheel 12 which is provided with traction lugs 13. The bearing blocks 11 are secured to the angle beams by the bolts 14 which pass adjustably through the slots 15 made in the beams 1 and 2. The slots are elongated in the direction of movement of the tractor and are for the purpose of permitting of adjustment of the bearing blocks 11 when taking up slack in the chain 8. If desired a screw 16 having threaded engagement with a fixed lug 17 is made for engagement with each block 11 for the purpose of thrusting the block rearwardly when the screw 16 is turned in one direction.

The main frame is provided with handles 18 suitably bolted or otherwise secured thereto at an intermediate part preferably just slightly rearward of the axle 10 and these handles diverge rearwardly and extend diagonally upward being appropriately braced as indicated at 19 and 20. The main frame and the handles also support the legs 21 upon which is carried the platform 22 and fuel tank 23 and a tool box 24 are supported upon the platform 22 as shown in Figure 1. The engine 3 is arranged to drive the tractor through the arrangement of gearing just referred to and a clutch 25 is disposed preferably between the small sprocket 7 and the gear wheel 5 for the purpose of disconnecting the engine whenever desired. The movable element of the clutch is connected to a bell crank lever 26 fulcrumed at an appropriate point of the main frame and connected for operation to a link 27 which extends to a hand lever 28 carried upon the rear handle brace 19 where it will be convenient for operation. The lever is provided with a hinged latch 29 adapted to cooperate with the perforated segment 30 whereby the clutch may be latched in a connected or disconnected position.

At the rear end of the main frame is a solid casting 31 riveted or otherwise secured between the beams 1 and 2 and adapted to receive the turning pin 32 of the caster wheel 33.

Under the main frame is supported a secondary frame such as shown in Figure 10 composed of the angle bars 34 and 35 spaced apart and suspended from the beams 1 and 2 of the main frame by pairs of front and rear links 36 and 37. The lower ends of the links pivot about rods 38 and 39 which extend transversely across between the members of the secondary frame. The upper ends of the links 36 and 37 are pivotally mounted to bolts 40 and 41 carried by the vertical webs of the beams 1 and 2. The suspension of the secondary frame is such as to admit of the adjustment vertically thereof together with the agricultural implements that the secondary frame is designed to carry. These agricultural implements may be of a varied character and in fact the arrangement is such as to admit of receiving the various known earth working implements. For ridge cultivation however I prefer to employ the arrangement and species of implements hereafter described.

The adjustment of the secondary frame is secured by a lever 42 fulcrumed at its lower end upon the rod 41 and having a bent end 43 extending parallel with the links 37 and being coupled at its lower end to the rod 39. A spring latch 44 is carried by the lever 42 and cooperates with the tooth segment 45 upon the main frame whereby to hold the lever and the secondary frame in the adjusted position. The secondary frame supports at its forward ends two plows 46 and 47, one right handed and the other left handed placed on opposite sides of the longitudinal center. The stocks 48 of the plows are riveted or otherwise secured to the rails 34 and 35. A central plow 49 is placed in back of the right and left plows and this central plow is a middle buster with larger mould boards.

In Figures 6, 7 and 8 is shown a harrow attachment for the secondary frame in which 50 designates the harrow points or teeth which are arranged with their innermost points at a low level and progressing upwardly and rearwardly from the inner to the outer points. These harrow points are separated the distance between the rows and they are carried as shown in Figure 8 by double braces 51 and 52 which join together at their lower ends where they connect with the points. The upper divergent ends are turned mutually toward one another as indicated at 53 and 54 and conform generally to the angle rails 55 and 56 which form portions of the harrow frames. These angle rails are strengthened at suitable points by the transverse brace 57 which are riveted or otherwise secured thereto, the rivets or other fastenings also passing through the angled ends 53 and 54 of the parts 51 and 52. The harrow frames are thus virtually parallelograms and the frames are held in the inclined positions shown by bars 58 and 59 which are bolted or otherwise secured to the parts 34 and 35 of the secondary frame. The bar 58 is substantially horizontal throughout its length being bent up only where it is secured to the harrow frame but the other bar comprises an elongated diagonal portion sloping up to meet a higher point of the harrow frame. The secondary frame is adapted to carry two such harrow frames one of which may be slightly in advance or in rear of the other or in other words the two harrow frames may be offset with respect to each other but they are similar as to construction and as to the manner of their connection with the secondary frame.

Now in Figure 8 there is shown a marking device resembling somewhat the harrows and provided with teeth 60 similar to the harrows but being three in number, one tooth in the middle and the other two teeth being disposed at the ends of a long bar 61 which extends transversely of the secondary frame and is bolted or otherwise removably secured thereto by the fastenings 62. The outer points or blades 60 may be made adjustable if desired.

Now referring to Figures 3, 4 and 5 as here shown a fertilizer distributor comprises a pair of hoppers or receptacles 63 having funnel bases 64 and eduction tubes 65 leading from the lower points thereof. In the throats 66 of the conical bases are rotary cylinders 67 having notches or chambers 68 for receiving the fertilizer and controlling its distribution to the tubes 65. The cylinders 67 are made adjustable by the use of set screws 69 on a shaft 70 by which the cylinders are turned. By adjusting the cylinders axially on the shafts the grooves or chambers 68 are made larger or smaller in accordance with the portions thereof remaining in connection with the throat. In this way the distribution of the fertilizer is regulated. The shaft 70 is carried in bearings 71 supported upon straps 72 which incidentally also support the receptacles 63. The straps 62 are carried by a bar 73 mounted transversely across the machine. On the shaft is a sprocket wheel 74 driven by a chain indicated at 75 in dotted lines from a sprocket 76 on the axle 10 as shown in Figures 2 and 3.

The work is accomplished as follows:—

First the land is laid off by means of the marker shown in Figure 9. At each turn in the field, the inner point is made to pass exactly over the last line marked, thus two new lines are made. The laying off of the field is important, for the ridges must be evenly spaced for the perfect work of the cultivator.

The second operation is the making of the ridges. The marking device is removed and the plows are put in place. The plows are set at the proper depth and a ridge is thrown up on either side of the machine. By simple side pressure on the handles the machine is easily guided. At the end of the row, the driving mechanism is thrown out of gear by the lever 28 and the plows may be raised out of the ground either by working the lever 42 or by simply lifting them out by the handles, the engine helping in this on account of its weight in front. The turn about is then easily made by pushing the handles sidewise if the plows are disengaged, or by walking around with the handles lifted up if the plows remain in position. Every turn results in the making of a ridge. The old way with a mule requires three turns, two with the clipper plow, and one with the middle buster.

For the cultivation and fertilization of the ridges, two clipper plows are removed and in their stead the side harrows are mounted on the secondary frame. One of them is mounted a few inches in front of the other in order that possible bundles of weeds or other obstructions may not be rolled up and packed on the main frame immediately behind the harrows and in front of the middle buster.

The harrows are set so as to cultivate the sides of two neighboring ridges at the depth wanted. The fertilizer attachment drops the fertilizer immediately behind same at a rate provided by the relative size of the sprocket wheels 74 and 76. The middle buster then takes the soil that has fallen down from the sides of the ridges and puts it up again in the same way as when the ridges were first made.

In the entire South, in all the Gulf States, the excessive rain fall calls for ridge cultivation, especially for trucking crops. So far no machine has successfully taken the place of the mule in this work. Such other machines as have been experimented with are all for cultivation on the level. This type of cultivation may also be achieved with the present machine by the use of proper implements.

The present machine however, accomplishes at one passage what otherwise would require from three actions in the process of making the ridges, to five actions in the cultivation thereof.

First. Passing with the side harrow up one side.

Second. Passing down on the other side.

Third. Application of fertilizer by hand on one side.

Fourth. Application of fertilizer on the other side.

Fifth. Passing with middle buster restoring the sides of the ridges.

In the making of ridges:

First. Going one way with the plow.

Second. Going the other way with the plow, leaving a six inch strip in the middle.

Third. Going over this middle strip with the middle buster, finishing the ridges.

On an average, therefore, the invention would save three trips, doing the work in one fourth the time and incidentally doing away with three mules and three farm hands out of every four and finally replace the fourth mule by the tractor.

It is obvious that various changes and modifications may be made in the details of construction and design of the above specifically described embodiment of this invention without departing from the spirit thereof, such changes and modifications being restricted only by the scope of the following claim.

What is claimed is:—

A walking plow comprising a bull wheel, an axle fixed to the bull wheel, a pair of side beams arranged closely against the opposite sides of the bull wheel and supported on the opposite ends of said axle, a motor mounted on the forward end of said beams in front of the bull wheel, a driving connection between the motor and one end of the axle and arranged at the outer side of the adjacent side beam, a pair of handles secured to the side beams closely adjacent to the ends of said axle and diverging rearwardly and upwardly therefrom, a pair of braces secured to the rear ends of said side beams and diverging upwardly therefrom and secured to said handle near the rear ends thereof, a cross brace extending between the rear ends of said handles, and means carried upon the rear ends of said side beams for supporting an agricultural implement.

JULIUS M. ZIMLICH.